Jan. 4, 1927.

W. A. DOREY

LUMINARY

Filed March 11, 1925

1,612,804

INVENTOR
William A. Dorey
BY
Joel Thiberman
his ATTORNEY

Patented Jan. 4, 1927.

1,612,804

UNITED STATES PATENT OFFICE.

WILLIAM A. DOREY, OF NEWARK, OHIO, ASSIGNOR TO HOLOPHANE GLASS COMPANY, OF NEW YORK, N. Y., A CORPORATION OF NEW JERSEY.

LUMINARY.

Application filed March 11, 1925. Serial No. 14,646.

The object of this invention is the construction of a system of combined reflecting and transmitting prisms to be used on one side of symmetrical glass enclosures for light sources and adapted to reflect part of the light rays back through the source, transmit part of the light rays upward and transmit part of the light rays downward. It is especially useful in refracting glasses designed to suppress the light through a narrow vertical arc and a wide lateral arc at one side of the lamp axis and to transmit an intensified beam through a narrow vertical arc and a wide lateral arc at the opposite side of the lamp axis.

Figure 1:
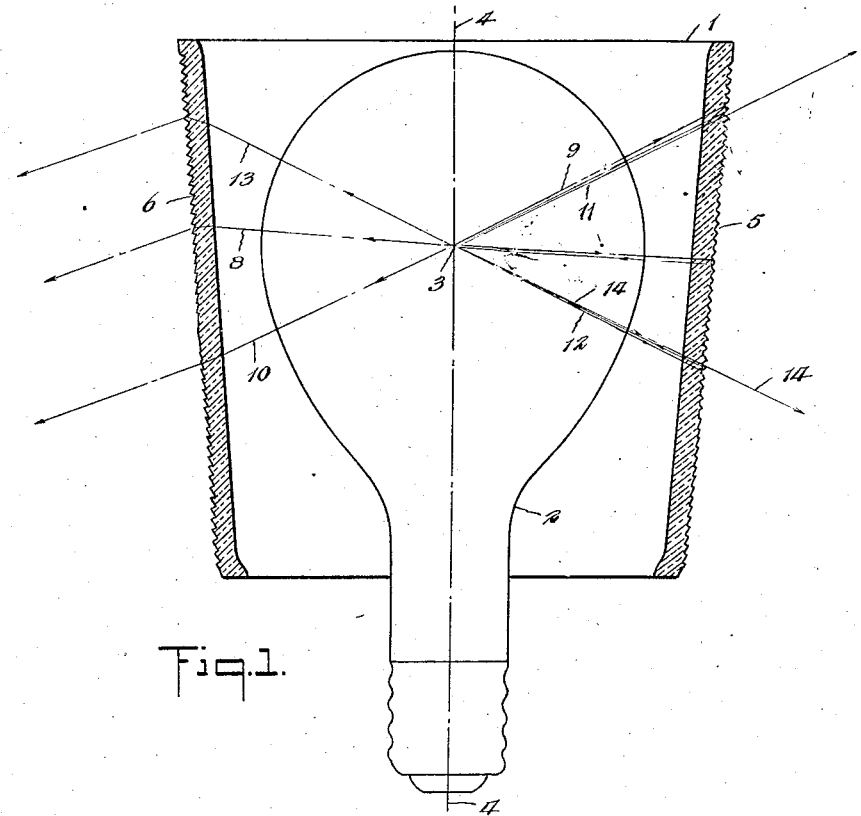
Fig. 1 shows a vertical cross section of a typical enclosure in which this special prism construction is used.

In Fig. 1, 1 is a prismatic glass enclosure surrounding a lamp 2, having its light source 3 in the axis of the enclosure 4, 4. One side of the enclosure 1 is provided on its outer surface with special horizontal reflecting and transmitting prisms 5. The opposite side is provided on its outer surface with horizontal refracting prisms 6. The reflecting elements of prism structure 5 near the center of the vertical cross section can be made to reflect the major part of the light rays back through the source as illustrated by typical ray 7, which, when reflected back through the source passes to the refracting prism structure 6 in a direction substantially coincident with that of ray 8 proceeding direct from the source. The reflecting elements of prism structure 5 in the upper part of the enclosure must be adjusted to have their axes parallel with the direction of the light rays in the glass in order to produce reflection back through the source and only a portion of the light rays can be so handled. Therefore transmitting elements are interposed between the reflecting elements to permit the transmission of a portion of the light rays in an upward direction. Typical ray 9 intercepted by a reflecting element in the upper part of the enclosure will be reflected back through the source and pass to the refracting prism construction in a direction coincident with that of ray 10 direct from the source. Typical ray 11 adjacent to ray 9 will be intercepted by a transmitting element and emitted upwardly as shown. In similar manner typical ray 12 intercepted by a reflecting element in the lower part of the structure will be reflected back through the source and pass to the refracting structure 6 coincident with ray 13 and ray 14 intercepted by a transmitting element will be transmitted downward as shown. The extreme lower portion of the special prism structure 5 consists of transmitting elements only because light rays reflected back through the source would pass through the open top of the enclosure and be of no use. The complete prism structure 5 suppresses the transmission of light to the greatest degrees in a direction normal to the contour of the enclosure and gives gradually increasing transmission upwards and downwards. The light reflected by the prism structure 5 is delivered to the refracting structure in substantially the same directions as light proceeding direct from the source so that both direct and reflected light may be distributed by the refracting structure as a single unit.

Figures 2, 3, 4:
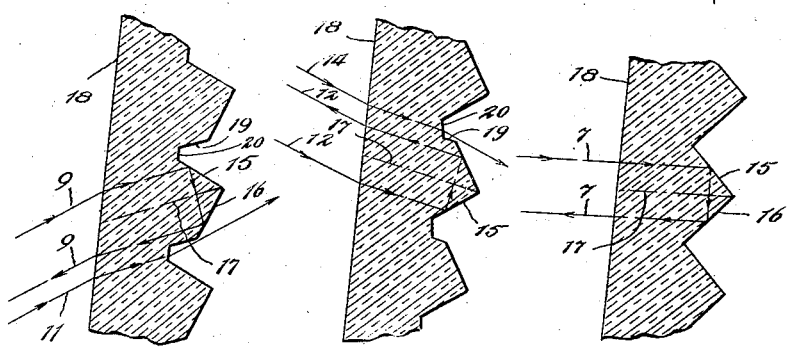
Figs. 2, 3 and 4 are enlarged vertical cross sections showing details of the special prism construction at various points on the enclosure shown in Fig. 1.

Fig. 4 shows an enlarged detail of the prism surface 5, Fig. 1 at the center of the enclosure. The prisms at this point are formed solely of two faces 15 and 16 meeting at an angle of 90°. The prism axis 17 is parallel to ray 7 in the glass and is perpendicular to the inner surface so the faces 15 and 16 are of substantially equal length and all rays reflected by one face will be intercepted by the second face and reflected back toward the light source.

Fig. 2 shows an enlarged detail of the prism structure 5, Fig. 1 in the upper part of the enclosure. The reflecting faces 15 and 16 have their axis 17 tilted to be parallel with ray 9 in the glass so that total reflection back through the source will be obtained. The faces 15 and 16 are made of equal width so that all light reflected by one face will be caught by the opposite face. To connect the prism with the next lower prism an intermediate surface 19 is introduced. This is parallel to the light rays in the glass. If this surface were connected directly to the next reflecting element an impracticable moulding condition would be introduced on account of the acute angle between the intermediate and the adjacent reflecting face.

Therefore a transmitting face 20 is interposed which permits light rays such as 11 to pass out of the glass in upward directions.

Fig. 3 shows an enlarged detail of prism structure 5, Fig. 1 below the center of the enclosure. The reflecting faces 15 and 16 are of equal width and have their axis tilted to be parallel to ray 12 in the glass. Intermediate face 19 is parallel to the light rays in the glass and face 20 permits ray 14 to pass out of the glass in a downward direction.

The special construction shown and described will usually extend through a lateral arc of 90° or ¼ of the circle increasing the light delivered to the refracting prisms in the opposite quarter but it may extend to as much as 180° or half the circle and increase the light delivered to the refracting prisms throughout the opposite half.

The enclosure described is of circular horizontal cross section but the same construction may be applied to advantage to symmetrical polygonal enclosure having an even number of panels opposite each other. In such polygonal structures the prismatic corrugations may be concentric on each panel instead of horizontal and the action of the special construction will be entirely similar.

I claim:

1. A luminary having on its outer surface a series of annular or curvilinear prismatic ribs forming double reflecting prisms with their angles so adjusted with reference to the light rays from the source incident upon them as to produce total reflection in combination with transmitting elements in the upper part of the structure which permit the transmission in upward directions of gradually increasing proportion of the light rays as the upper edge of the structure is approached, in combination with refracting elements in the lower portion of the structure which transmit and deflect increasing proportion of the light rays toward the bottom edge of the structure as the bottom edge of the structure is approached.

2. A luminary symmetrical with reference to a light source having on a portion of its outer surface a series of annular or curvilinear prismatic ribs forming double reflecting prisms with their angles so adjusted with reference to the light rays from the source incident upon them as to produce total reflection adapted to reflect light rays to the opposite side of the luminary, in combination with transmitting elements in the upper part of the structure which permit the transmission in upward directions of gradually increasing proportion of the light rays as the upper edge of the structure is approached, in combination with refracting elements in the lower portion of the structure which transmit and deflect increasing proportion of the light rays toward the bottom edge of the structure as the bottom edge of the structure is approached.

3. A luminary having on its outer surface a series of prisms combining total reflecting elements adjusted to give total reflection to those light rays from the center of the source which are not normal to the inside surface, in combination with transmitting surfaces in the upper part of the structure which permit upward transmission of light and refracting surfaces in the lower part of the construction which transmit and deflect all rays downward.

4. A luminary symmetrical with reference to a light source having on a portion of its outer surface a series of prisms combining total reflecting elements adapted to reflect light rays to the opposite side of the luminary adjusted to give total reflection to those light rays from the center of the source which are not normal to the inside surface, in combination with transmitting surfaces in the upper part of the structure which permit upward transmission of light and refracting surfaces in the lower part of the construction which transmit and deflect all rays downward.

Signed at Newark, in the county of Licking and State of Ohio, this 7th day of March, 1925.

WILLIAM A. DOREY.